(12) United States Patent
Howard

(10) Patent No.: US 7,135,076 B2
(45) Date of Patent: Nov. 14, 2006

(54) MEMORY METAL ACTIVATION SYSTEM

(75) Inventor: Robert J. Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 382 days.

(21) Appl. No.: 10/633,156

(22) Filed: Aug. 4, 2003

(65) Prior Publication Data
US 2005/0028901 A1 Feb. 10, 2005

(51) Int. Cl.
B32B 15/04 (2006.01)

(52) U.S. Cl. .............. 148/402; 428/457; 502/337; 502/439

(58) Field of Classification Search ............ 148/402, 148/563; 428/457
See application file for complete search history.

(56) References Cited
U.S. PATENT DOCUMENTS

| | | | |
|---|---|---|---|
| 3,606,592 A | 9/1971 | Madurski et al. | |
| 4,018,547 A | 4/1977 | Rogen | |
| 4,621,882 A | 11/1986 | Krumme | |
| 5,092,901 A | 3/1992 | Hunter et al. | |
| 5,215,456 A * | 6/1993 | Fujiwara | 431/7 |
| 5,299,548 A | 4/1994 | Beall | |
| 5,510,598 A | 4/1996 | Kawam et al. | |
| 5,879,832 A | 3/1999 | Vu et al. | |
| 6,037,071 A | 3/2000 | Poirier et al. | |
| 6,165,633 A * | 12/2000 | Negishi | 429/17 |
| 6,379,393 B1 | 4/2002 | Mavroidis et al. | |
| 6,696,185 B1 * | 2/2004 | Okamoto | 429/12 |
| 6,924,055 B1 * | 8/2005 | Hirsch et al. | 429/34 |

* cited by examiner

Primary Examiner—George Wyszomierski
(74) Attorney, Agent, or Firm—DeMont & Breyer, LLC

(57) ABSTRACT

A memory metal expands through the use of a catalyst and a fuel-oxidizer mixture. The catalyst can be placed directly onto the surface of the memory metal, or it can just be in the proximity of the metal. The fuel-oxidizer mixture similarly can be placed on the surface of the metal or just near the metal. The oxidation of the fuel can be initiated by a spark, heat, or some other source, and the heat from the exothermic reaction raises the temperature of and causes the expansion of the memory metal.

29 Claims, 6 Drawing Sheets

MEMORY METAL ACTIVATION SYSTEM

FIELD OF THE INVENTION

The present invention relates to memory metal actuators, and in particular, the activation of such actuators via a catalytic reaction of a fuel-oxidizer pair.

BACKGROUND OF THE INVENTION

Memory metals in general change shape and have unusually large expansion coefficients in a specific temperature range known as the metal's transition temperature range. These phenomena are most commonly described by those of skill in the art as superelasticity and shape memory. By applying heat to a memory metal in its transition temperature range, such metal can be made to expand to a greater extent in a shorter period of time than ordinary metals.

NITINOL (Nickel Titanium Naval Ordnance Laboratory), which contains nearly equal portions of nickel and titanium, is one of the more common memory metals. Its shape memory properties have been used in the manufacture of pipe couplings, connectors and actuators. Most recently, memory metals in general have been finding applications as actuators and artificial muscles in robotic applications.

SUMMARY OF THE INVENTION

The present invention is an article, system and method relating to the activation of a memory metal. A memory metal is exposed to a catalyst and a fuel-oxidizer pair. The fuel-oxidizer pair reacts exothermically, and the energy released from this reaction heats the memory metal, causing the memory metal to expand. A spark or other external initiator may be required to commence the reaction, or the catalyst-fuel-oxidizer combination may auto-ignite. The relaxation of the memory metal may be brought about by controlling the amounts of catalyst and/or fuel-oxidizer mixture, and flowing air over the memory metal. The memory metal can be formed into shapes including tubes, wires, or plates depending on the application. In one embodiment, the catalyst and fuel-oxidizer mixture are chosen so that the reaction is not self sustaining. Auxiliary heat is then supplied to the system, permitting the reaction to be sustained and activate the memory metal. When the auxiliary heat is removed, the reaction cannot sustain itself and the memory metal relaxes.

It is therefore an object of a preferred embodiment of the present invention to activate a memory metal actuator via a catalytic reaction of a fuel-oxidizer pair.

DETAILED DESCRIPTION OF THE INVENTION

Figure 1:
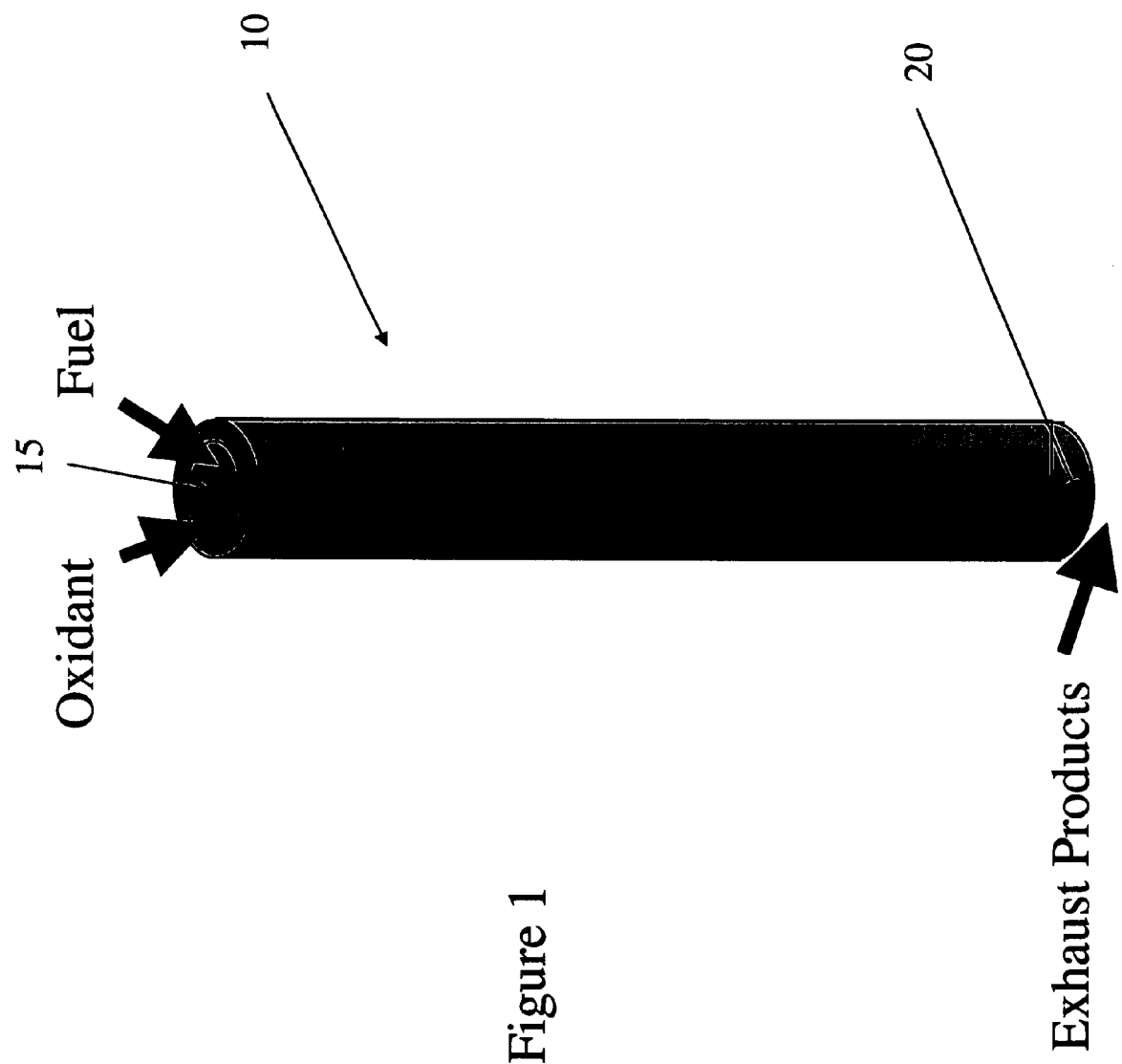
FIG. 1 illustrates an embodiment of the present invention in which a memory metal is formed into tubes.

The present invention is an article, system and method for causing the expansion of a memory metal.

In the present invention, a catalyst is applied to the surface of, or in close proximity to, a memory metal. A fuel-oxidizer pair is then introduced into the vicinity of the memory metal, followed by a reaction initiator to commence an exothermic chemical reaction or combustion of the fuel-oxidizer pair. The heat generated by the chemical reaction or combustion on or near the surface of the memory metal raises the temperature of the memory metal which in turn causes the memory metal to expand. In several embodiments, a fuel-oxidizer mixture is allowed to flow over the memory metal and/or through a memory metal matrix of wires, tubes or plates.

The catalyst that is applied to the memory metal lowers the energy barrier of the chemical reaction or combustion. The lowering of the energy barrier by the catalyst increases the energy densities without damaging the actuator and increases the response time of the actuator. Additionally, since heat is applied directly to the memory metal, the system of the present invention is efficient as less heat is wasted to the surrounding environment.

Reaction initiators include a spark or heat. Heat may be applied in a number of ways, including direct combustion or direct application through an external source, or internally by heating the actuator itself or just a portion of it. The actuator can be heated by running a current through it. Some catalyst-fuel-oxidizer mixtures however do not require the application of heat as they are capable of auto-ignition. If the application of heat is required to initiate the reaction, either the catalyst, the fuel-oxidizer mixture, or the actuator can be heated.

The chemical reaction or combustion can be controlled and/or deactivated in at least two ways. The amount and rate of the fuel-oxidizer mixture in the system can be controlled. Increasing the amount and rate of the fuel-oxidizer flow will increase the reaction or combustion respectively and increase the heat applied to the memory metal. Likewise, decreasing the amount and/or rate of the fuel-oxidizer flow will decrease the reaction, decrease the heat supplied to the memory metal, and decrease the temperature of the memory metal. Secondly, the chemical reaction or combustion can be controlled by controlling the temperature of the memory metal. One way of doing this is by operating the actuator in a region where the oxidation reaction does not supply enough heat to make the reaction self-sustaining as explained in detail below. Alternatively, the actuator could be heated in a controlled manner by running a current through it i.e. electrical resistance heating, or using some other auxiliary heat source. The flow of air past, over and/or through the actuator can be used to improve relaxation time.

Several different fuel-oxidizer pairs may be used in the present invention. Examples include hydrogen-oxygen, ammonia-oxygen, hydrocarbon vapor-oxygen, and alcohol vapor-oxygen. In all of these examples, the oxygen used can be that found in the atmosphere. Monopropellants and catalyst pairs may also be used. Indeed, any exothermic chemical reaction or combustion that can be controlled by a catalyst may be used. The catalysts that can be used for each of these different fuel-oxidizer pairs are known to those of skill in the art, and include for example palladium, platinum, and copper. In a preferred embodiment, the actuator is enclosed to limit the loss of the fuel-oxidizer. Such an enclosure will also protect the actuator in harsh environments.

Several different configurations of the present invention are illustrated in FIGS. 1, 2, 2a, 3 and 3a. In FIG. 1, the memory metal is shaped into a tube 10 with opening 15 at one end and opening 20 at an opposite end. A catalyst of choice is coated onto the inside surface of the tube 10, onto the outside surface of the tube 10, and/or near the outside or inside surfaces of the tube 10. A fuel-oxidizer pair is introduced into opening 15 of the tube, and travels through the inside of the tube thereby coming into contact with the catalyst coated on the inside of the tube 10. If catalyst is coated on the outside of the tube 10, the fuel-oxidizer pair is allowed to travel along the outside of the tube 10 also. The catalyst lowers the energy barrier for the fuel-oxidizer pair as the fuel-oxidizer pair travels through the tube 10. Heat, a spark or other reaction initiator is introduced causing combustion of the fuel-oxidizer pair and the release of heat from the exothermic reaction. The heat from the exothermic reaction raises the temperature of the memory metal of the tube 10, thereby causing the expansion of the tube 10. The expansion of tube 10 will be in both a longitudinal and radial direction.

Figure 2:
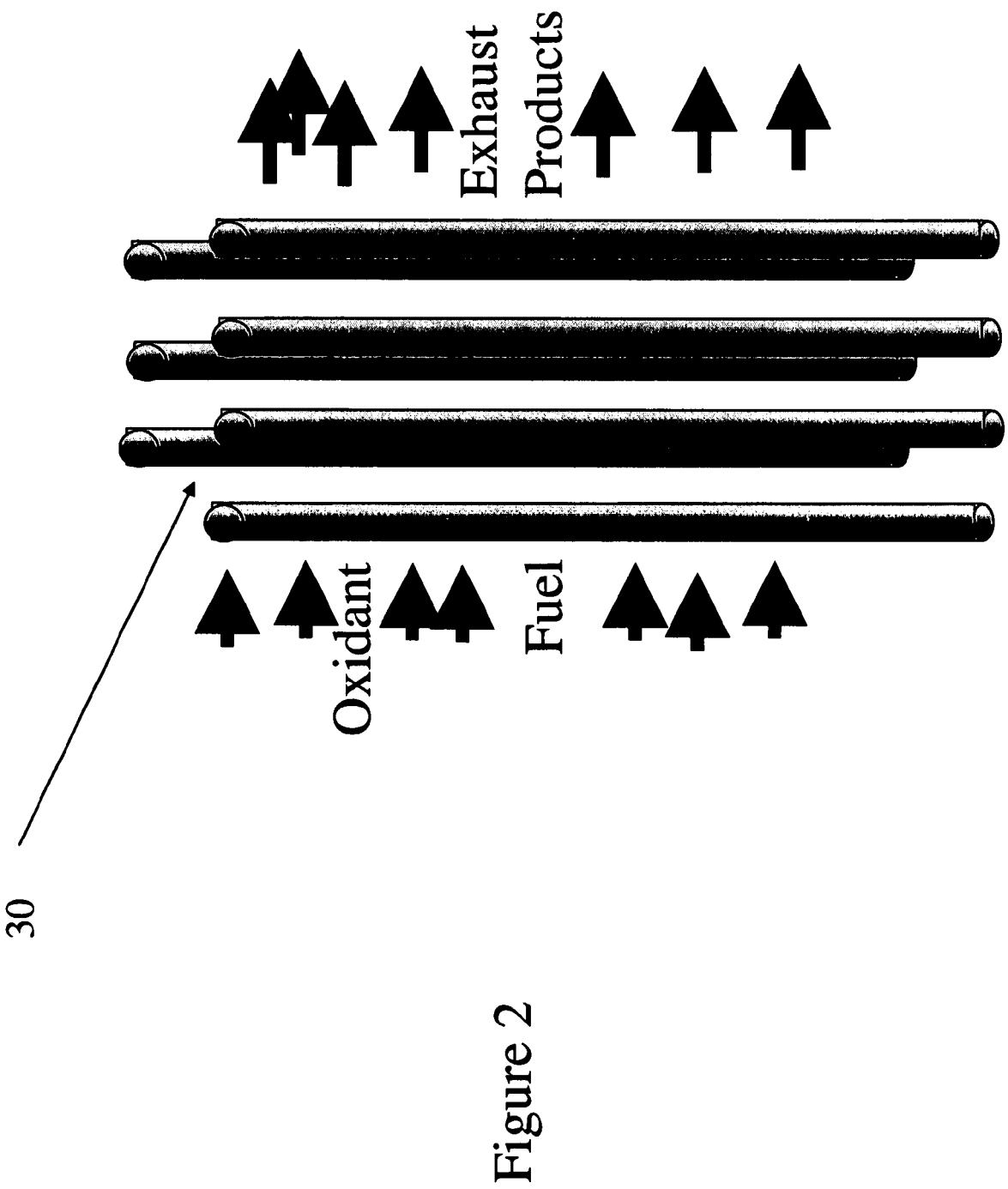
FIG. 2 illustrates an embodiment of the present invention in which a memory metal is formed into wires.
Figure 2A:
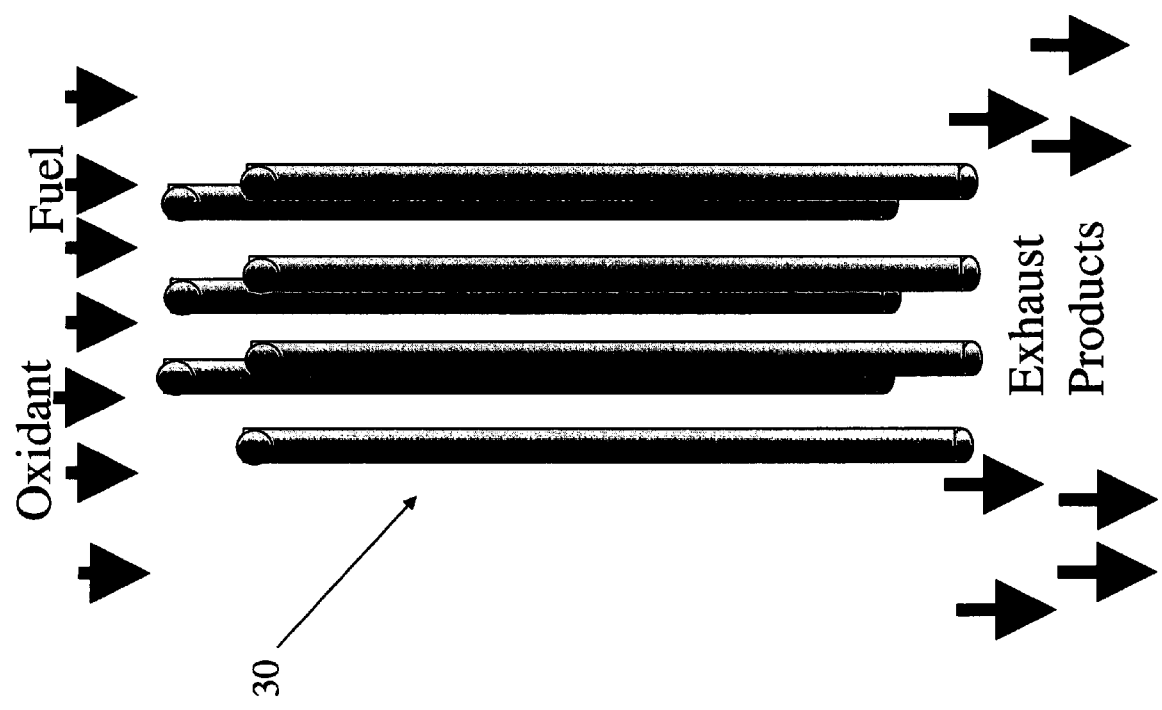
FIG. 2a illustrates a variation of the embodiment of FIG. 2 in which the fuel-oxidizer mixture is introduced at the ends of the wires.

A second embodiment of the present invention is illustrated in FIG. 2. FIG. 2 shows several wires 30 which are made out of a memory metal. The wires are coated with a catalyst of choice for a particular fuel-oxidizer pair. The fuel-oxidizer pair is introduced into the area of the wires 30 and ignited. The heat from the exothermic reaction raises the temperature of the wires 30, and causes the memory metal of which the wires 30 are made to expand. The expansion is both longitudinal and radial. In this embodiment, as shown in FIG. 2, the fuel-oxidizer pair can be introduced along the lengths of the wires, and travel through and among the wires, or as shown in FIG. 2a, the fuel-oxidizer pair can be introduced at the ends of the wires, travel longitudinally along the wires, and the exhaust products exit at the opposite ends of the wires.

Figure 3:
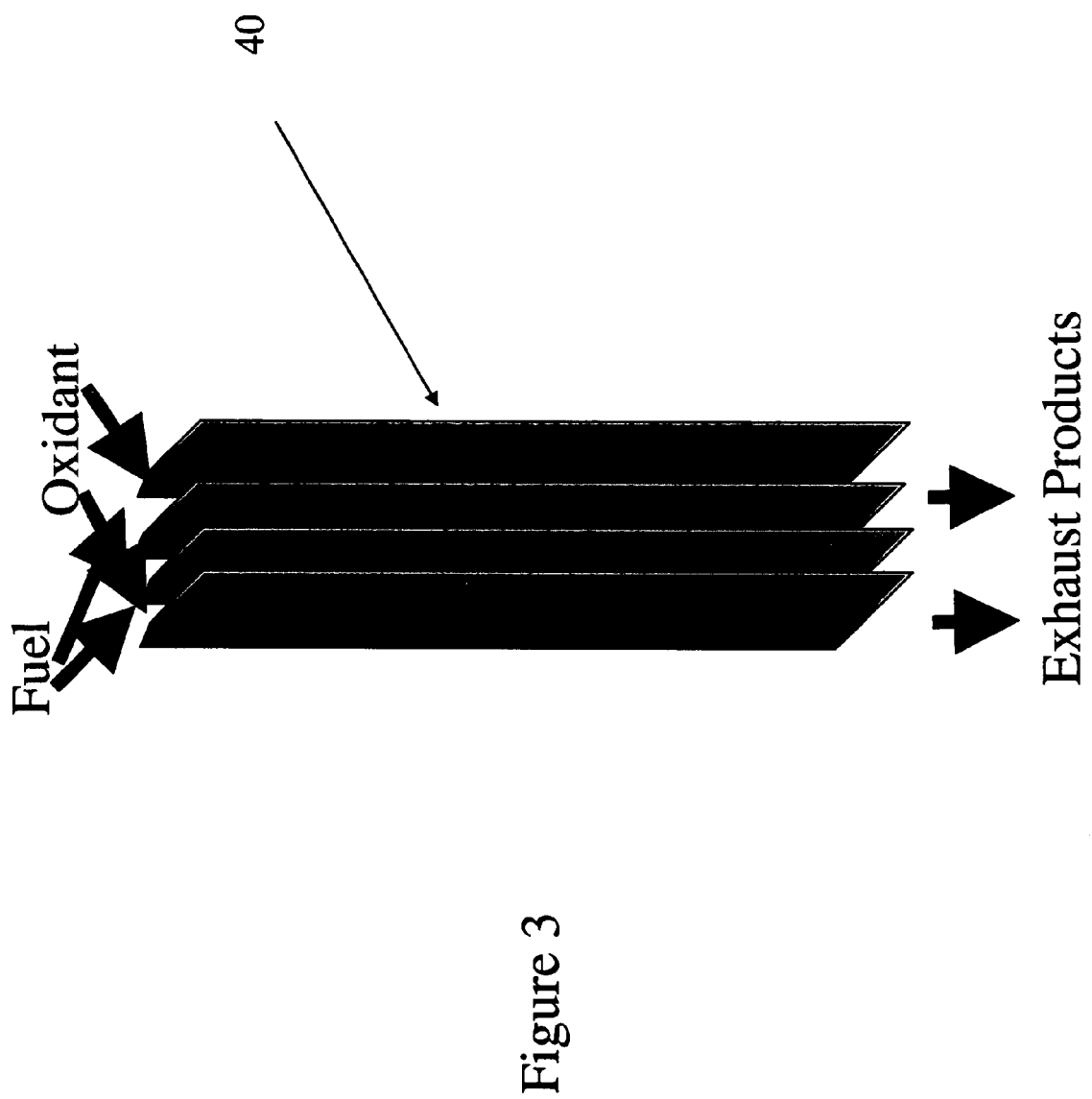
FIG. 3 illustrates an embodiment of the present invention in which a memory metal is formed into ribbons, bands, and/or plates.
Figure 3A:
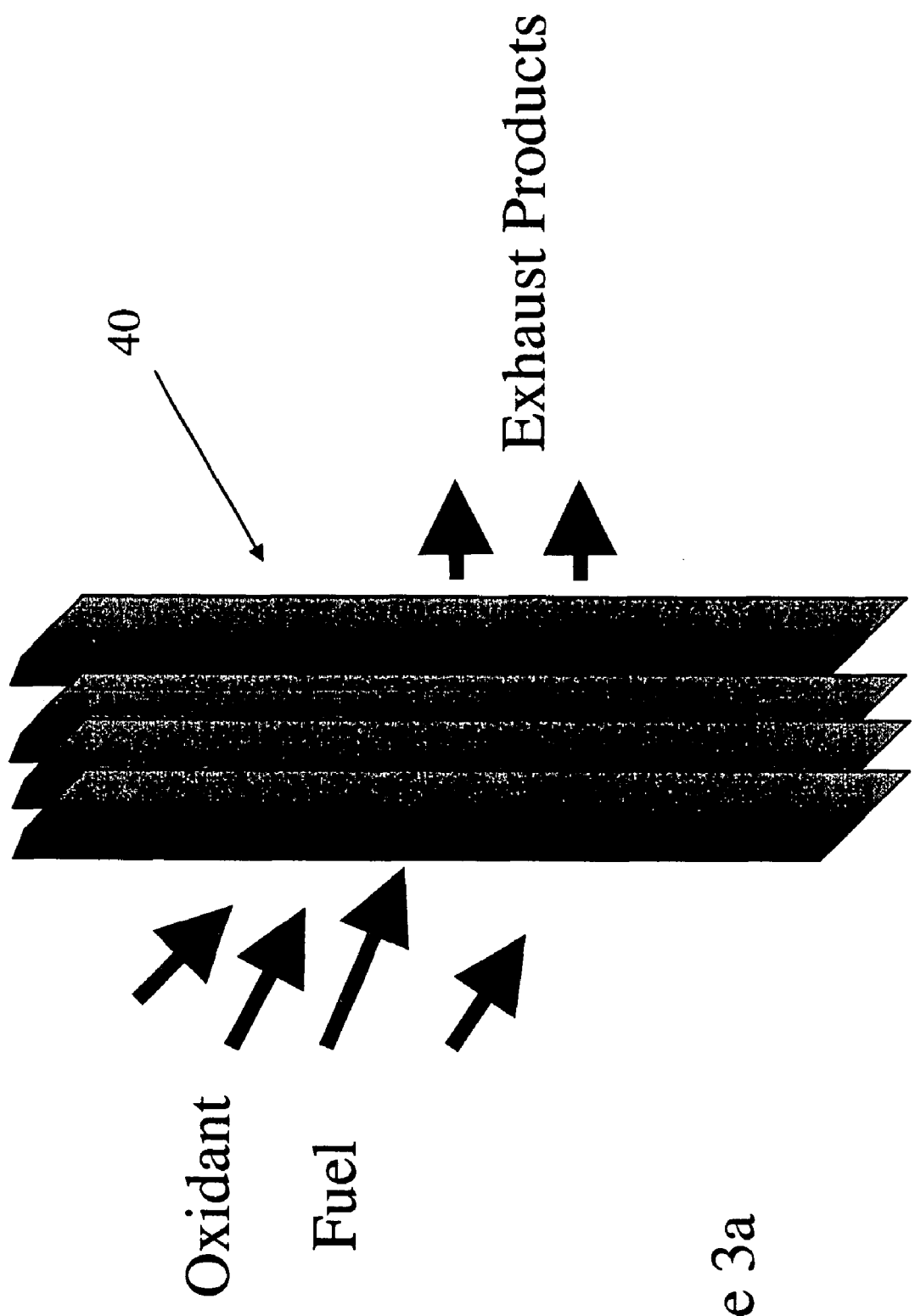
FIG. 3a illustrates a variation of the embodiment of FIG. 3 in which the fuel-oxidizer mixture is introduced at the sides of the ribbons, bands, and/or plates.

In a third embodiment, the memory metal is pressed into ribbons or plates 40 as shown in FIG. 3. The appropriate catalyst for the fuel-oxidizer pair is spread on the surfaces of the ribbons or plates. In a preferred embodiment, both surfaces of the plates/ribbons are coated with the catalyst. The fuel-oxidizer pair can be introduced at one of the longitudinal ends of the plate as shown in FIG. 3, at the opposite longitudinal end, or at either side of the plates/ribbons. See also FIG. 3a. However, it is preferred that the fuel-oxidizer pair be introduced at one of the longitudinal ends so that as it travels the length of the plate, it is in contact with the catalyst for a greater period of time. The heat generated by the exothermic fuel-oxidizer reaction causes the expansion of the memory metal. The expansion occurs both longitudinally and transversely.

As alluded to above, another way to control the reaction of the fuel-oxidizer pair involves selecting the catalyst, fuel-oxidizer mixture, and the amounts thereof so that the reaction rate is too low to be self sustaining. In such a reaction state, ambient heat losses will significantly exceed the heat generated by the reaction of the fuel-oxidizer pair, resulting in a reaction temperature range that prevents the reaction from being self sustaining. When it is desired that the reaction be sustained, the temperature of the catalyst is raised, and the reaction rate increases exponentially. When the heat source used to raise the temperature of the catalyst is removed, the reaction cannot once again sustain itself, the temperature of the memory metal decreases, and the actuator relaxes.

It is possible to adjust such a system so that there is a temperature range where the sum of the auxiliary heat and the heat generated by the fuel/oxidizer mixture balances the heat losses. While the system can be kept in this range either by careful temperature control or by controlling the amount/composition of the fuel-oxidizer mixture, the simpler approach is to control the amount of fuel-oxidizer supplied to the actuator. When the system operates in this temperature range the removal of the auxiliary heat source causes the reaction rate to drop dramatically, allowing the actuator to cool because the thermal losses again exceed the heat being applied. If enough catalyst/fuel/oxidizer is supplied, the system will latch in the hot state.

Figure 4:
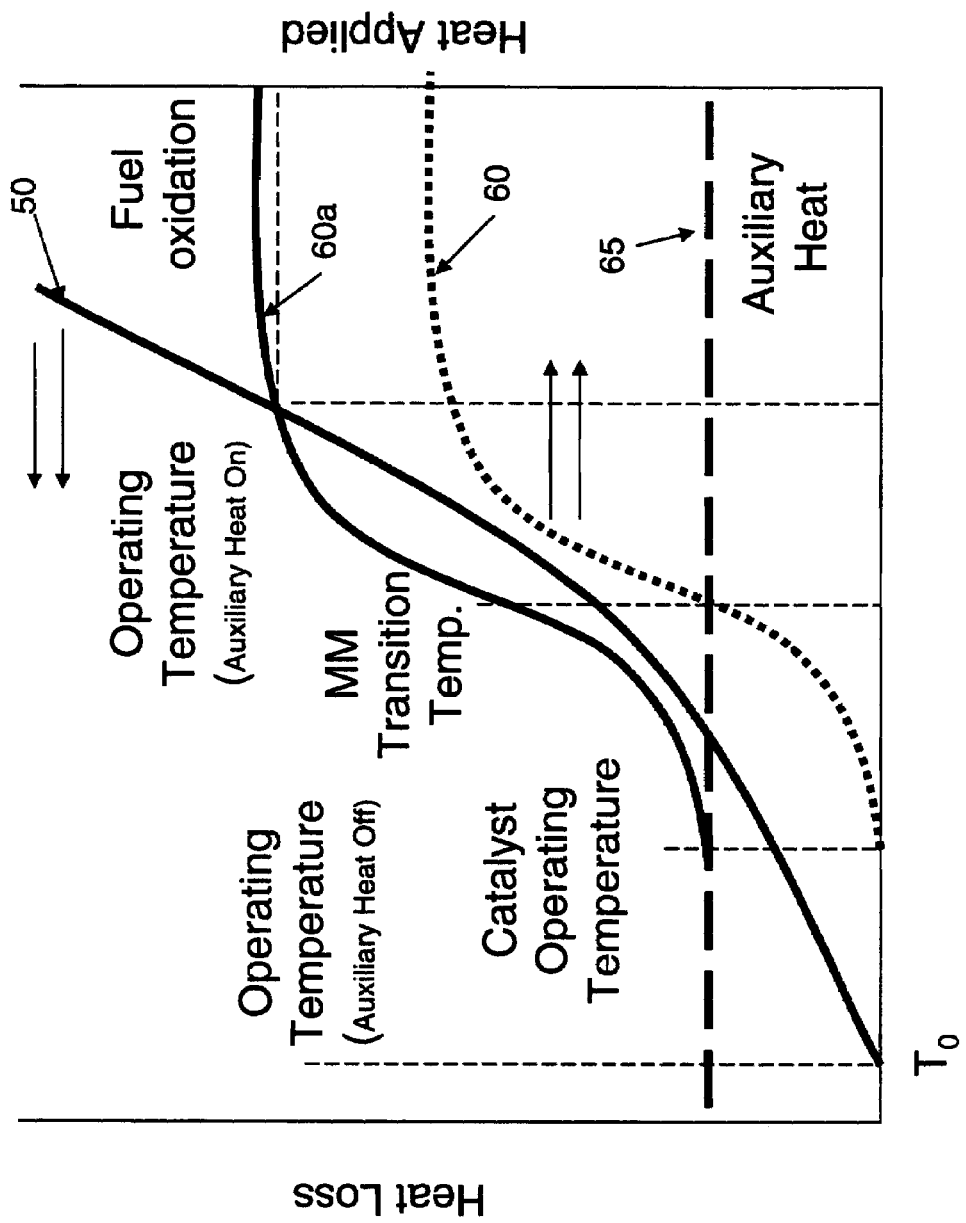
FIG. 4 is a graph illustrating an embodiment of the present invention in which auxiliary heat must be supplied to sustain a reaction of a fuel-oxidizer pair.

FIG. 4 graphically illustrates this reaction control mechanism. Specifically, referring to line 50, FIG. 4 shows on the left ordinate that as the actuator temperature rises, the heat loss of the system also rises. Similarly, the actuator temperature rises in proportion to the heat applied as shown on the right ordinate. The dotted line 60 illustrates that the heat provided by oxidation alone is below the heat loss (line 50), such that the catalyst cannot maintain the oxidation. However, once the auxiliary heat is applied as indicated by line 65, the catalyst is activated, resulting in the shifting up of line 60 to line 60a, and the establishment of a new equilibrium point at the intersection of lines 50 and 60a. At the equilibrium point, the heat loss is equal to the heat applied plus the heat from the reaction. Also, the equilibrium point is above the memory metal's transition temperature so that at equilibrium, the memory metal is in its activated state.

While the invention has been described in its preferred embodiment, it is to be understood that the words used are words of description rather than limitation and that changes may be made within the purview of the appended claims without departing from the true scope and spirit of the invention in its broader aspects.

The invention claimed is:

1. A system comprising:
   a memory metal; and
   a catalyst, wherein said catalyst is disposed as a coating on a first surface of said memory metal.

2. The system of claim 1, further comprising a fuel-oxidizer mixture.

3. The system of claim 2 wherein said fuel-oxidizer mixture is disposed on said first surface of said memory metal.

4. The system of claim 2 wherein said fuel-oxidizer mixture is disposed on a second surface of said memory metal.

5. The system of claim 2 further comprising a reaction initiator to commence a reaction of said fuel-oxidizer mixture.

6. The system of claim 2 wherein said fuel-oxidizer mixture is selected from the group consisting of hydrogen-oxygen, ammonia-oxygen, hydrocarbon vapor-oxygen, and alcohol vapor-oxygen.

7. The system of claim 2 wherein said fuel-oxidizer mixture comprises a monopropellant.

8. The system of claim 1 further comprising a heat source, wherein said heat source provides a sufficient amount of heat to said system to provide a self-sustaining reaction.

9. The system of claim 1 wherein said memory metal comprises NITINOL.

10. The system of claim 1 wherein said memory metal comprises a tube.

11. The system of claim 1 wherein said memory metal comprises a wire.

12. The system of claim 1 wherein said memory metal comprises a plate.

13. The system of claim 1 wherein said catalyst is selected from the group consisting of palladium, platinum, and copper.

14. A system comprising:
a memory metal; and
a fuel-oxidizer mixture, wherein said fuel-oxidizer mixture is disposed as a coating on a first surface of said memory metal.

15. The system of claim 14, further comprising a catalyst.

16. The system of claim 15 wherein said catalyst is disposed on said first surface of said memory metal.

17. The system of claim 15 wherein said catayst is disposed on a second surface of said memory metal.

18. The system of claim 14 further comprising a reaction initiator to commence a reaction of said fuel-oxidizer mixture.

19. The system of claim 14 further comprising a heat source, wherein said heat source provides a sufficient amount of heat to said system to provide a self-sustaining reaction.

20. A method comprising:
providing a memory metal having a catalyst disposed as a coating thereon; and
exposing said memory metal and said catalyst to a fuel-oxidizer mixture.

21. The method of claim 20 further comprising initiating a reaction of said fuel-oxidizer pair using a reaction initiator.

22. The method of claim 20 wherein the operation of exposing further comprises flowing said fuel-oxidizer mixture over said memory metal and said catalyst.

23. The method of claim 20 wherein the operation of exposing further comprises applying said fuel-oxidizer mixture to said memory metal.

24. The method of claim 20 wherein selection of at least one of: (1) choice of catalyst; (2) amount of catalyst; (3) choice of fuel-oxidizer; and (4) amount of fuel-oxidizer results in a non-sustaining reaction.

25. The method of claim 24 further comprising applying heat so that said reaction is sustained.

26. The method of claim 25 further comprising controlling said amount of fuel-oxidizer mixture so that a sum of heat applied and heat generated during said reaction balances loss of heat.

27. The method of claim 20 wherein a reaction of said fuel-oxidizer mixture occurs in a transition temperature range of said memory metal.

28. The method of claim 20 further comprising flowing air over said memory metal.

29. The method of claim 28 further comprising ceasing exposure of said memory metal and said catalyst to said fuel-oxidizer mixture.

* * * * *